United States Patent [19]

Ishibashi et al.

[11] Patent Number: 5,679,434
[45] Date of Patent: Oct. 21, 1997

[54] BELTLINE WEATHER STRIP

[75] Inventors: Hiroshi Ishibashi; Hideki Naito, both of Hiroshima, Japan

[73] Assignee: Nishikawa Rubber Co., Ltd., Hiroshima, Japan

[21] Appl. No.: 595,294

[22] Filed: Feb. 1, 1996

[30] Foreign Application Priority Data

Feb. 28, 1995 [JP] Japan ................................ 7-068708

[51] Int. Cl.$^6$ ................................................ E06B 7/16
[52] U.S. Cl. .................... 428/120; 49/498.1; 49/484.1; 49/496.1; 296/154; 296/155
[58] Field of Search .......................... 428/119, 120, 428/31; 49/484.1, 498.1, 496.1, 377, 490.1; 296/154, 155

[56] References Cited

U.S. PATENT DOCUMENTS 5,388,371  2/1995  Nozaki ................................. 49/377

FOREIGN PATENT DOCUMENTS

| 0 178 064 A3 | 4/1986 | European Pat. Off. . |
| 0 507 231 A2 | 10/1992 | European Pat. Off. . |
| 2 307 450 | 11/1976 | France . |
| 2 228 061 | 12/1973 | Germany . |
| 2 202 889 A | 10/1988 | United Kingdom . |

Primary Examiner—Alexander Thomas
Attorney, Agent, or Firm—Flynn, Thiel, Boutell & Tanis, P.C.

[57] ABSTRACT

A beltline weather strip accommodated in a door panel for elastically contacting a door glass plate and for sliding the door glass plate comprises a base which is substantially parallel to the door glass plate with a cored bar embedded therein, a solid lip protruding from the upper door glass plate side surface of the base, and a hollow lip protruding from the lower door glass plate side surface of the base, wherein the upper side of the hollow lip is curved inwardly at the root end portion thereof and outwardly at the tip end portion thereof, forming an S-shaped curved upper side as a whole, and a ratio between the curvature radius Ra of the inwardly curved root end portion of the upper side of the hollow lip and the curvature radius Rb of the outwardly curved tip end portion thereof is set in the range of Ra: Rb=1:2.5 to 1:3.5. As a result, it is possible to provide a beltline weather strip being excellent in slidability to be superior to prior art by 20–30% while being equivalent thereto in lip reaction force.

1 Claim, 5 Drawing Sheets

BELTLINE WEATHER STRIP

BACKGROUND OF THE INVENTION

1. Field of the Invention

The present invention relates to a beltline weather strip accommodated in a door panel, the beltline weather strip having high lip reaction force against a door mounted glass plate and being excellent in slidability thereagainst.

2. Prior Art

A conventional beltline weather strip is accommodated in a door panel for elastically contacting a door glass plate 50 which moves up and down and for sliding against the door glass plate. A beltline weather strip includes a base 31 which is substantially parallel to the door glass plate 50 with a cored bar 20 embedded therein, a solid lip 32 protruding from the door glass plate to an upper side surface of the base 31, and a hollow lip 33 protruding from the door glass plate to a lower side surface of the base 31, as shown in FIGS. 1 to 4. The reason why the hollow lip 33 is provided is to prevent the rattling of the door glass plate 50 and to improve sealing performance between the door glass plate 50 and the beltline weather strip by increasing lip reaction force U against the door glass plate 50.

In each of conventional beltline weather strips shown in FIGS. 1 to 3, the upper side of the hollow lip 33 is curved inwardly at the root end P portion thereof and outwardly at the tip end Q portion thereof, forming an S-shaped curved upper side as a whole. The relationship between the curvature radius Ra of the inwardly curved root end P portion and the curvature radius Rb of the outwardly curved tip end Q portion of the upper side of the hollow lip 33 is expressed as follows.

That is, Ra=Rb is established and a notch 35 is provided in the inner surface at the root end of the lower side of the hollow lip 33 in the conventional weather strip 3b shown in FIG. 1, a ratio of being equal to Ra:Rb≠5:2 is established in the conventional weather strip 3c shown in FIG. 2, a ratio of being equal to Ra:Rb≠1:2 is established in the conventional weather strip 3d shown in FIG. 3. On the contrary, a conventional weather strip 3e shown in FIG. 4 has a hollow lip 33 with the upper side of which being curved outwardly at the root end P portion thereof and inwardly at the tip end Q portion thereof.

However, each of the conventional weather strips 3b, 3c, 3d and 3e has a problem that slidability relative to the door glass plate 50 is deteriorated although the reaction force U of the lip relative to the door glass plate 50 is increased. FIG. 5 shows a relationship between the displacement of the door glass plate 50 and the lip reaction force U as well as sliding resistance T in the conventional weather strips.

Problems to be solved by the invention are as follows.

In each of the conventional weather strips, the lip reaction force U against the door glass plate 50 is increased but the slidability relative to the door glass plate 50 is deteriorated.

SUMMARY OF THE INVENTION

Accordingly, it is an object of the present invention to overcome the aforementioned drawbacks of the conventional beltline weather strips and to provide a beltline weather strip having high lip reaction force and being excellent in slidability.

The present invention will be now described with reference to FIGS. 6 and 8.

A beltline weather strip 3a accommodated in a door panel for elastically contacting a door glass plate 50 and for sliding against the door glass plate includes a base 31 which is substantially parallel to the door glass plate 50 with a cored bar 40 embedded therein, a solid lip 32 protruding from the upper side surface of the base 31 to the door glass plate, and a hollow lip 33 protruding from the lower side surface of the base 31 to the door glass plate, wherein the upper side of the hollow lip 33 is curved inwardly at the root end P portion thereof and outwardly at the tip end Q portion thereof, forming an S-shaped curved upper side as a whole, and the ratio between curvature radius Ra of the inwardly curved root end P portion and the curvature radius Rb of the outwardly curved tip end Q portion of the upper side of the hollow lip 33 is set in a range of Ra:Rb=1:2.5 to 3.5.

DESCRIPTION OF THE PREFERRED EMBODIMENTS

Figure 1:
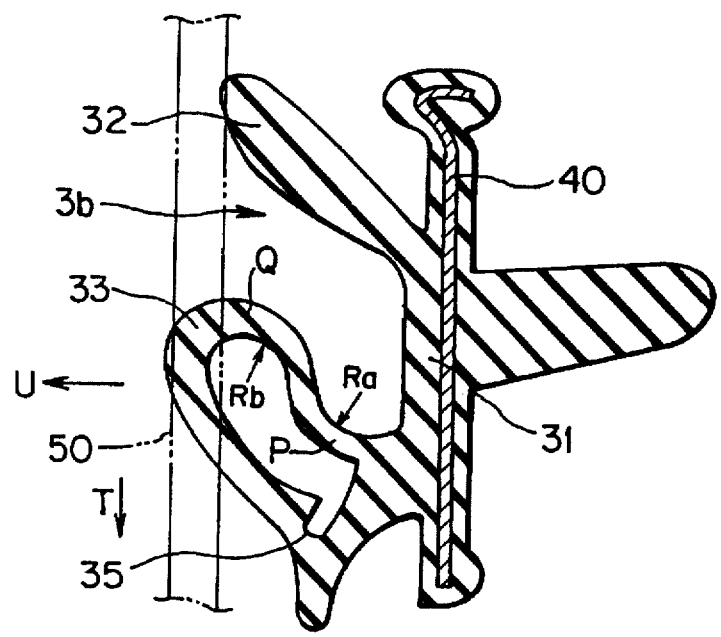
FIG. 1 is a cross-sectional view of a beltline weather strip according to a first prior art example.
Figure 2:
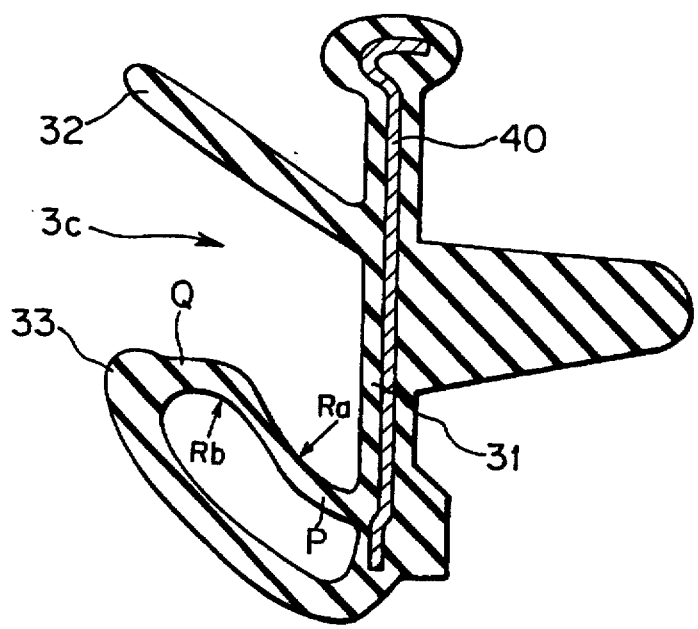
FIG. 2 is a cross-sectional view of a beltline weather strip according to a second prior art example.
Figure 3:
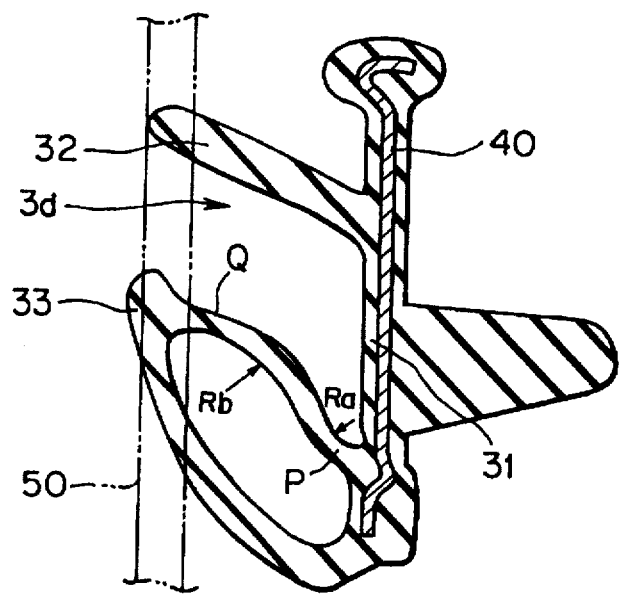
FIG. 3 is a cross-sectional view of a beltline weather strip according to a third prior art example.
Figure 4:
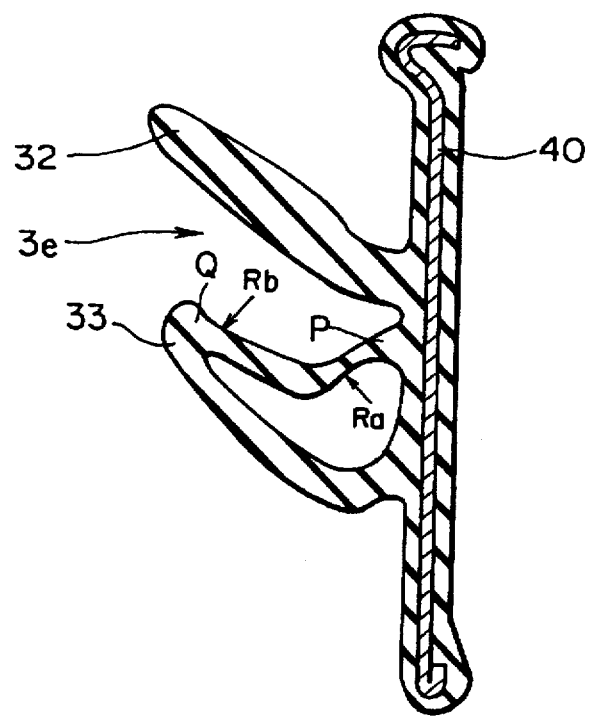
FIG. 4 is a cross-sectional view of a beltline weather strip according to a fourth prior art example.
Figure 5:
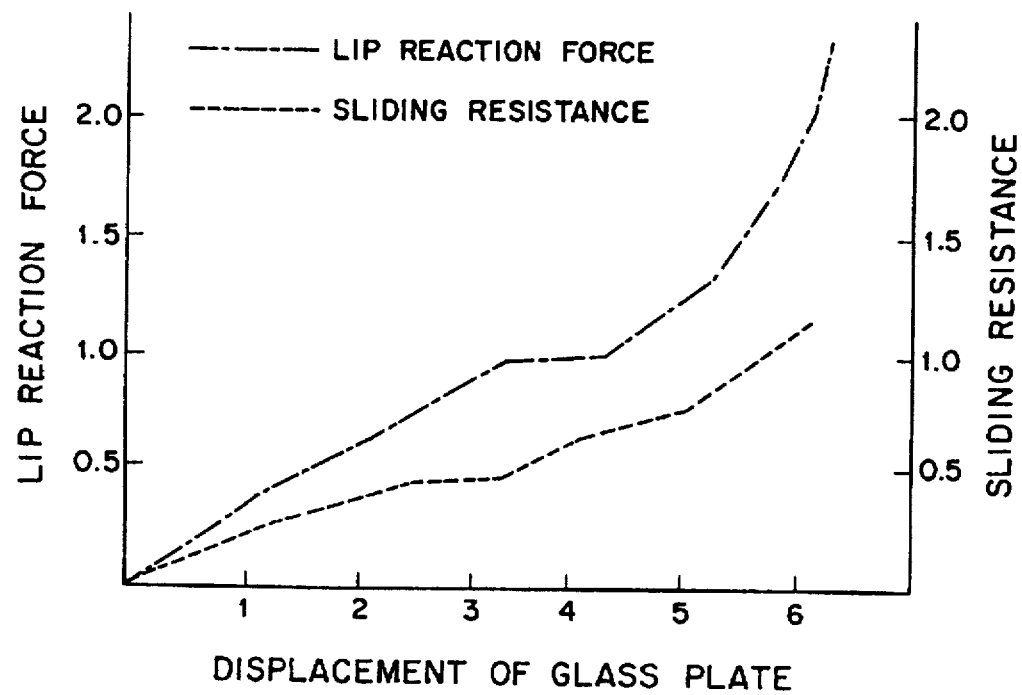
FIG. 5 is a graph showing displacement-of-glass-plate-to-lip-reaction-force/sliding-resistance curves of the beltline weather strip according to a prior art.
Figure 6:
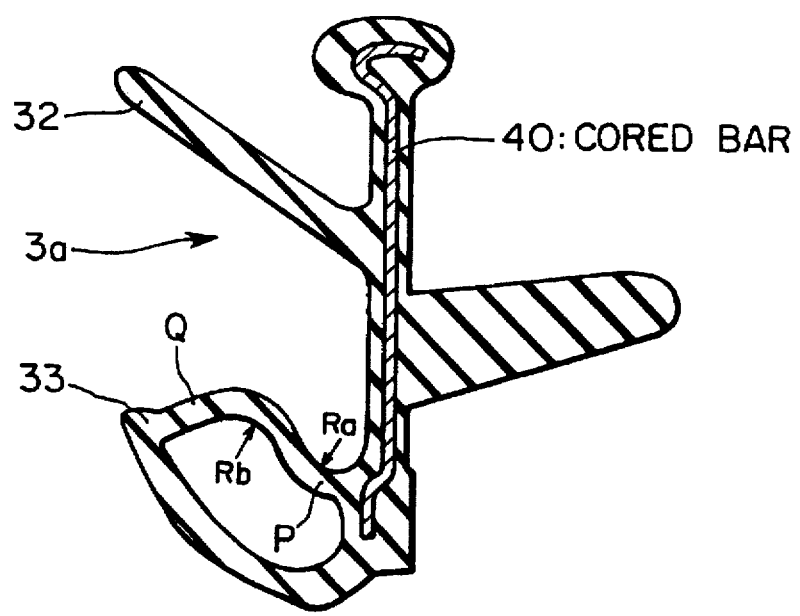
FIG. 6 is a cross-sectional view of a beltline weather strip according to the present invention.
Figure 7:
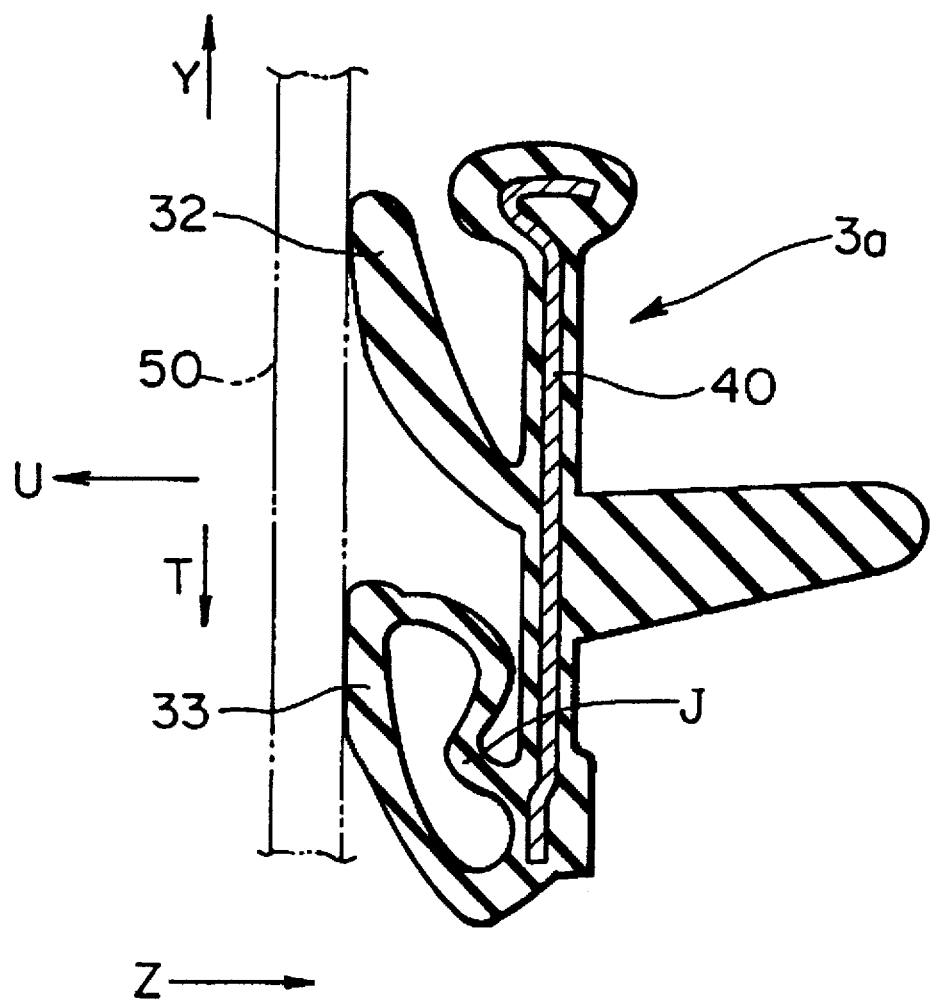
FIG. 7 is a cross-sectional view showing a state where the beltline weather strip elastically contacts a door glass plate according to an embodiment of the present invention.

An embodiment of the present invention will be now described with reference to FIGS. 6 to 9.

Denoted at 50 is a door glass plate which moves up and down. 3a is a beltline weather strip for elastically contacting the door glass plate 50 and for sliding against the door glass plate. The beltline weather strip is structured as follows.

That is, the beltline weather strip includes a base 31 which is substantially parallel to the door glass plate 50 with a cored bar 40 embedded therein, a solid lip 32 protruding from the upper surface of the base 31 facing the door glass plate, and a hollow lip 33 protruding from the lower side surface of the base 31 facing the door glass plate, wherein the upper side of the hollow lip 33 is curved inwardly at the roost end P portion thereof adjacent the base 31 and outwardly at the tip end Q portion thereof to form an S-shaped curved upper side as a whole, and the ratio between the curvature radius Ra of the inwardly curved root end P portion and the curvature radius Rb of the outwardly curved tip end Q portion of the upper side of the hollow lip 33 is within the range of Ra:Rb=1:25 to 1:35.

A conventional beltline weather strip has the problems that when Rb/Ra is less than 2.5, both the lip reaction force and sliding resistance are increased at the initial state of flexure and when Rb/Ra is more than 3.5, both the lip reaction force and sliding resistance are increased since the upper side of the hollow lip 33 contacts the base 31 earlier than that of the prior art when the hollow lip 33 is deformed.

Figure 8:
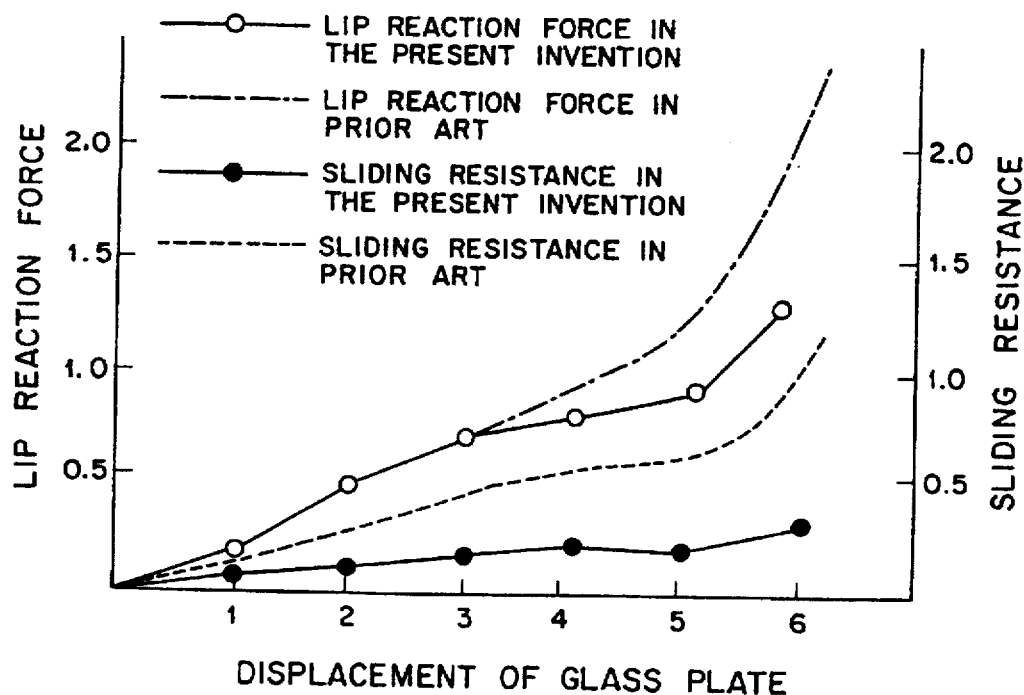
FIG. 8 is a graph for comparing displacement-of-glass-plate-to-lip-reaction-force/sliding-resistance curves of the beltline weather strip of the present invention with those of the prior art.
Figure 9:
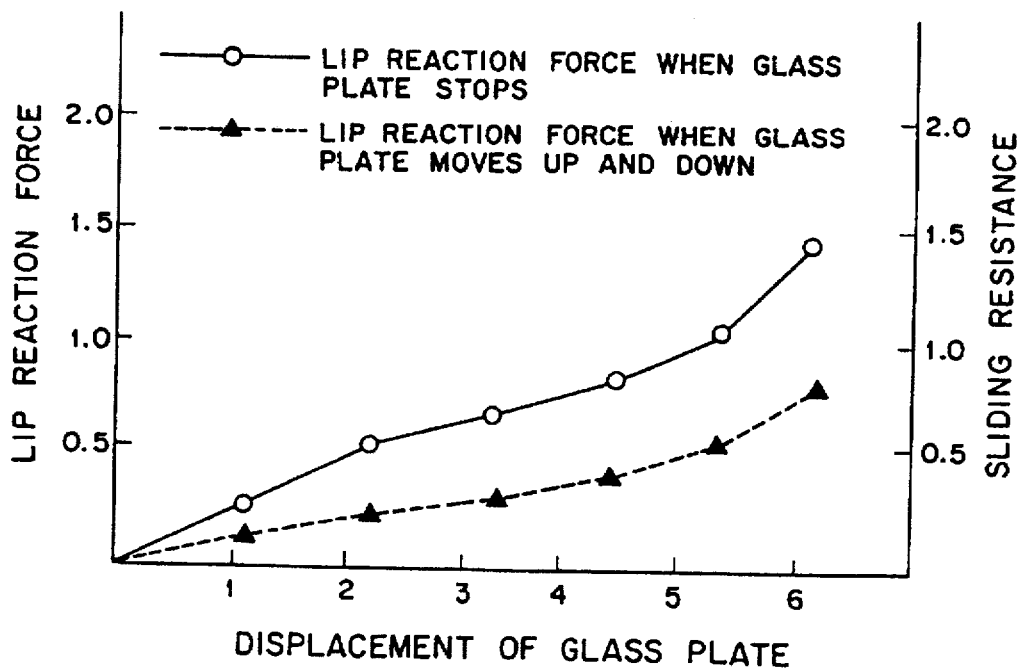
FIG. 9 is a graph showing displacement-of-glass-plate-to-lip-reaction-force/sliding-resistance curves of the beltline weather strip at the time when the door glass plate is stopped and those during the elevation of the door glass plate according to the present invention.

However, in the case of the present invention wherein Ra/Rb=2.5 to 3.5 is established, the inwardly curved root end P portion of the upper side of the hollow lip 33 is pushed by the door glass plate 50 to a bent and deformed position at a bending point J which is lower than that of the prior art so that a stress concentration hardly take place. As a result, the lip reaction force U at the time when the door glass plate 50 is stopped is about twice as much as that during the elevation of the door glass plate 50 as shown in FIG. 9, so that sliding resistance is remarkably reduced (by 20 to 30%) as shown in FIG. 8 while the lip reaction force U is equivalent to that of the conventional beltline weather strip.

Besides, the displacement-of-glass-plate/to/lip-reaction-force curve rises gently, which shows the excellent slidability and also a preferable tendency relative to the fitting variation of the door glass plate.

Owing to the above arrangement of the present invention, slidability is excellent since the sliding resistance is reduced by 20 to 30% compared with that of the conventional beltline weather strip, while lip reaction force is kept equivalent to the conventional beltline weather strip.

What is claimed is:

1. A beltline weather strip accommodated in a door panel for elastically contacting a door glass plate and for sliding against said door glass plate, comprising:

a base which is substantially parallel to said door glass plate with a cored bar embedded therein;

a solid lip protruding from an upper side surface of said base toward the door glass plate; and a hollow lip protruding from a lower side surface of said base toward the door glass plate;

wherein an upper side of said hollow lip is curved inwardly at a root end portion thereof and outwardly at a tip end portion thereof forming an S-shaped curved upper side, and a ratio between a curvature radius Ra of the inwardly curved root end portion and a curvature radius Rb of the outwardly curved tip end portion of the upper side of said hollow lip is within the range of Ra:Rb being equal to 1:2.5 to 1:3.5.

* * * * *